(12) United States Patent
Hoyos et al.

(10) Patent No.: US 7,236,909 B1
(45) Date of Patent: Jun. 26, 2007

(54) AUTONOMIC DATA ASSURANCE APPLIED TO COMPLEX DATA-INTENSIVE SOFTWARE PROCESSES BY MEANS OF PATTERN RECOGNITION

(75) Inventors: Carlos A. L. Hoyos, Morrisville, NC (US); Marcelo Perazolo, Cary, NC (US); Viswanath Srikanth, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/464,365

(22) Filed: Aug. 14, 2006

(51) Int. Cl.
*G06F 11/00* (2006.01)
(52) U.S. Cl. .................. 702/182; 705/10; 714/738
(58) Field of Classification Search ............... 702/19, 702/32, 90, 182, 183; 700/121; 707/3, 5, 707/100, 102; 705/1, 10, 26, 36, 5; 714/738
See application file for complete search history.

(56) References Cited

U.S. PATENT DOCUMENTS

| | | | |
|---|---|---|---|
| 6,862,574 B1 | 3/2005 | Srikant et al. | |
| 6,873,914 B2 * | 3/2005 | Winfield et al. | ............... 702/19 |
| 2003/0130899 A1 | 7/2003 | Ferguson et al. | |
| 2004/0010505 A1 | 1/2004 | Vishnubhotla | |
| 2004/0102994 A1 | 5/2004 | Boppana | |
| 2005/0080806 A1 | 4/2005 | Doganata et al. | |
| 2005/0267831 A1 | 12/2005 | Esary et al. | |
| 2005/0278227 A1 | 12/2005 | Esary et al. | |
| 2005/0278597 A1 * | 12/2005 | Miguelanez et al. | ........ 714/738 |

* cited by examiner

*Primary Examiner*—John Barlow
*Assistant Examiner*—John H. Lee
(74) *Attorney, Agent, or Firm*—Cantor Colburn LLP

(57) ABSTRACT

A method for predicting and automatically verifying data assurance of a plurality of data values located in software processes in an e-commerce environment by a pattern recognition module, the method comprising: running the software processes on a data processing device; priming the software processes for creating baseline information based on collected data values; evaluating the baseline information by the pattern recognition module by comparing the collected data values of the baseline information with predetermined data values of predetermined information stored in a baseline database; establishing relationships between the collected data values and the predetermined data values to produce output data; determining whether the output data is valid; flagging data values outside permitted bounds; permitting a user to perform manual data assurance on the data values outside the permitted bounds; and updating the baseline database to include the collected data values of the baseline information without the data values outside the permitted bounds.

5 Claims, 3 Drawing Sheets

AUTONOMIC DATA ASSURANCE APPLIED TO COMPLEX DATA-INTENSIVE SOFTWARE PROCESSES BY MEANS OF PATTERN RECOGNITION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a method for autonomic data assurance, and particularly to a method for automating an auditing process where modifications to a system are predicted and automatically verified by a pattern recognition mechanism.

2. Description of Background

A common problem in software development is how to verify that a complex software element that provides a data altering function (or service) integrates correctly and produces predictable and valid output. As an example, an e-commerce component is considered that is responsible for processing an order.

The e-commerce component is integrated with several different components. These components include: an order capture component, which is usually a web interface that collects user input about the order, an order processing component, which is a main element that coordinates all other elements, a catalog component, which is utilized to check if entries in the order match with offered items in the store catalog, and if pre-processed prices are correct, an inventory component, a fulfillment component, a shipping component, tax components, a payment component, and an external payment provider component.

This complex function of order processing involves several different database values, calculates new values, and updates the database accordingly at the end of the process. In some specific processes, such as the prior example of the order processing system, these modifications follow an established pattern, which can be predicted and automatically verified for data assurance purposes. For processes involving monetary transactions, assurance is often a required element and is performed manually, e.g., human review of orders and associated payment reports to make sure no discrepancies have occurred. However, this manual assurance by human review is expensive and time consuming.

Considering the limitations of the aforementioned methods, it is clear that there is a need for a method for reducing human intervention when performing an auditing process. In the proposed method an automatic data assurance module compares and then selects patterns that can be automatically audited. In other words, a method of data assurance for e-commerce where modifications to a system are predicted and verified for data assurance by means of pattern recognition is highly desirable.

SUMMARY OF THE INVENTION

The shortcomings of the prior art are overcome and additional advantages are provided through the provision of a method for predicting and automatically verifying data assurance of a plurality of data values located in software processes in an e-commerce environment by a pattern recognition module, the method comprising: running the software processes on a data processing device; priming the software processes for creating baseline information based on collected data values; verifying the collected data values of the baseline information of the software processes; evaluating the baseline information by the pattern recognition module by comparing the collected data values of the baseline information with predetermined data values of predetermined information stored in a baseline database; establishing relationships between the collected data values and the predetermined data values to produce output data; creating a data assurance report including the output data; determining whether the output data is valid; storing the output data in the storage device; flagging data values outside permitted bounds; permitting a user to perform manual data assurance on the data values outside the permitted bounds; and updating the baseline database to include the collected data values of the baseline information without the data values outside the permitted bounds.

The shortcomings of the prior art are overcome and additional advantages are provided through the provision of a system for predicting and automatically verifying data assurance of a plurality of data values located in software processes in an e-commerce environment by a pattern recognition module, the system comprising: a network; and a host system in communication with the network, the host system including software to implement a method comprising: running the software processes on a data processing device; priming the software processes for creating baseline information based on collected data values; verifying the collected data values of the baseline information of the software processes; evaluating the baseline information by the pattern recognition module by comparing the collected data values of the baseline information with predetermined data values of predetermined information stored in a baseline database; establishing relationships between the collected data values and the predetermined data values to produce output data; creating a data assurance report including the output data; determining whether the output data is valid; storing the output data in the storage device; flagging data values outside permitted bounds; permitting a user to perform manual data assurance on the data values outside the permitted bounds; and updating the baseline database to include the collected data values of the baseline information without the data values outside the permitted bounds.

The shortcomings of the prior art are overcome and additional advantages are provided through the provision of a computer program product for predicting and automatically verifying data assurance of a plurality of data values located in software processes in an e-commerce environment by a pattern recognition module, the computer program product comprising: a storage medium readable by a processing circuit and storing instructions for execution by the processing circuit for performing a method comprising: running the software processes on a data processing device; priming the software processes for creating baseline information based on collected data values; verifying the collected data values of the baseline information of the software processes; evaluating the baseline information by the pattern recognition module by comparing the collected data values of the baseline information with predetermined data values of predetermined information stored in a baseline database; establishing relationships between the collected data values and the predetermined data values to produce output data; creating a data assurance report including the output data;

determining whether the output data is valid; storing the output data in the storage device; flagging data values outside permitted bounds; permitting a user to perform manual data assurance on the data values outside the permitted bounds; and updating the baseline database to include the collected data values of the baseline information without the data values outside the permitted bounds.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for a method for automatically auditing data where modifications to a system are predicted and automatically verified for data assurance by means of pattern recognition.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
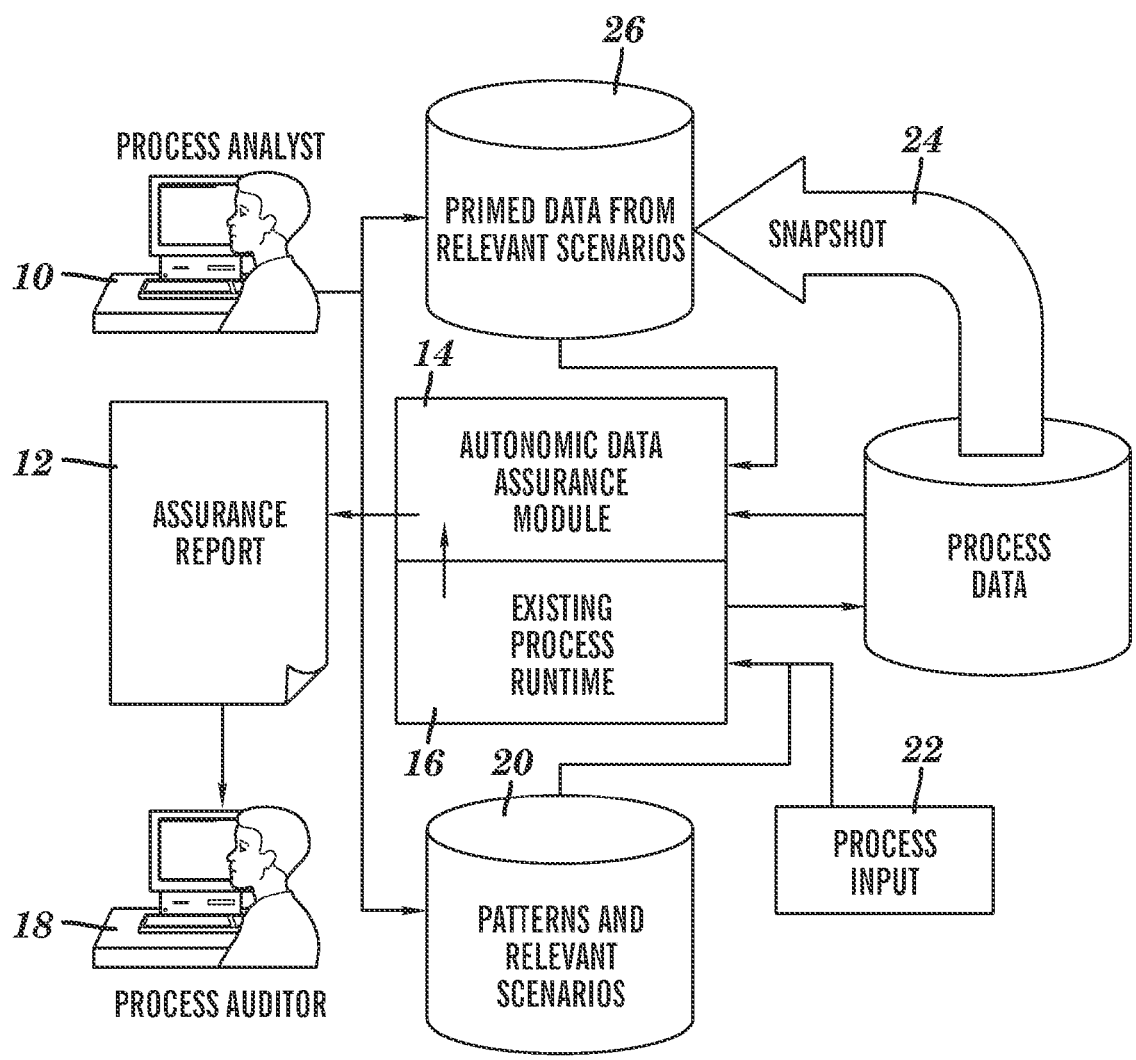
FIG. 1 illustrates one example of an autonomic data assurance system according to the exemplary embodiments of the present invention.

One aspect of the exemplary embodiments is a method for partially automating an auditing process. Another aspect of the exemplary embodiments is a method for comparing and then selecting patterns of data elements that can be automatically audited by an automatic data assurance module by predicting and automatically verifying modifications by pattern recognition mechanisms.

One object of the exemplary embodiments of the present invention is to partially automate the auditing process so the human intervention is reduced to a minimum. The autonomic data assurance method described below is intended to flag suspect entries so that a human would have a much shorter list of items to review when performing manual auditing/assurance of data in the auditing process.

A central point to the disclosure of the exemplary embodiments of the present invention is the concept of "priming" a process, or running it a finite number of times in order to provide the autonomic data assurance module with baseline values used during runtime operation. This is similar to the process of "priming" a voice recognition system with the tone and pitch of a person's voice so that it can automatically process sound (raw data) and recognize words (context data) from the data stream. Likewise, what the exemplary embodiments propose is a "priming" process that provides baseline information for the processing of raw process-related data and recognizes a certainty percentage that informs a user of how confident the auditing process is, i.e., if the output data is valid or if the output data is not valid.

In voice recognition, a system is "trained" with representative cases by asking the user to recite keywords and keyphrases that provide the elements from which the voice recognition software abstracts other non-recited cases (words and phrases). Likewise, the exemplary embodiments require that the "priming" process be run on some specific scenarios that are usually borderline and defined by policies inherent to the process. Each process has a finite number of representative cases that may be determined prior to the training phase of the system.

Moreover, unlike voice recognition systems, in the exemplary embodiments of an autonomic data assurance system, some of the raw data can be easily assured by simple strong typing analysis. For example, it is known that in an order system the items in the order must be part of the catalog. In addition, it is known that dates follow a progression and has a valid range (no purchases in the future, the sequencing in order numbers also follow a sequencing in time, etc). This data should not be part of the defined data patterns and can be easily be verified.

However, according to the exemplary embodiments, the pattern recognition module would evaluate other data, which are variable in nature. The order-processing example provides a good illustration of such a requirement, in which a user is interested in comparing patterns containing data elements. The data elements contained in these patterns may include: items ordered and their associated catalog prices, a final price to be paid by the customer for the order, what elements were applied that would change the final order price, such as coupons, discounts, promotional items, shipping prices, tax, etc., what payment methods were used, how much was captured from these payment methods in different stages of the order-processing (capture, fulfillment, shipping), and was there a return associated, and how much was refunded to the customer). One can make data patterns as complex as the number of data variables in the process. The exemplary embodiments postulate that such patterns thus configured can be automatically audited by an autonomic data assurance module that was previously "primed" with relevant baseline data.

Referring to FIG. 1, one example of an autonomic data assurance system according to the exemplary embodiments of the present invention is illustrated. The autonomic data assurance system includes a process analyst 10, an assurance report 12, an autonomic data assurance module 14, an existing process runtime 16, a process auditor 18, a patterns and relevant scenarios database 20, a process input 22, a data processor 24, and a primed data from relevant scenarios database 26. One element that is not shown is the data-reporting element that would otherwise provide the full report of all data to the process auditor 18. However, this element is substituted by the assurance report 12 produced by the autonomic data assurance module. The metadata that describes data patterns and the relevant scenarios for priming could be represented in a series of different ways, which depend on where the data to be analyzed is located. For example, if the data is all in a database, the patterns would consist of a series of database table names and their relationship with each other. Likewise, if the data is runtime memory data the patterns could consist of simple classes in memory. The relevant scenarios consist of carefully chosen values that serve as input to the defined patterns.

As a simple example a "Returns" process is considered below. In the "Returns" process a user want to make certain, for example, that the refunded amount is not greater than the charged amount in the original order.

The pattern that would enforce this scenario could be defined as follows:

ReturnProcess

RETURN

RMA_amount

ORDER

ORDER_amount

The relevant scenarios would be a finite set of samples where: ORDER_amount≧RMA_amount. These are samples defined by the process analyst and would provide a basis for the pattern recognition engine resident in the autonomic data assurance module to recognize the hidden relationships in the data set. Concerning the exemplary embodiments of the present invention, the pattern recognized would simply be the relationship: ORDER_amount≧RMA_amount.

In a real system there would be many relationships that would compose a pattern, and they would all be checked at real time once the pattern recognition engine is primed. If there were an anomaly at runtime where the relationships in the pattern don't hold, this would be flagged by the assurance report 12 for posterior analysis by a human element. This could be, for example, a situation where the RMA amount is $100 but the order amount was $80. There could be perfectly valid reasons for this happening, but the system will flag it as an anomaly because it doesn't follow the primed pattern relationships.

Another similar scenario is where gift certificates are generally processed before credit cards or other forms of payment. When this does not happen, the system flags it for review—unless it is the established pattern at certain geographies, in which case the system considers it a part of the regular behavioral pattern.

The autonomic data assurance module 14 is a facilitator module where the patterns defined by the process analyst 10 are fed to the underlying pattern recognition system, coupled with an anomaly-reporting component that gathers the output of the pattern recognition system and creates an anomaly entry on all the situations where a pattern is not recognized. Depending on the underlying pattern recognition system, extra information, like the degree of certainty of a pattern could also be considered, and anomalies would consist of situations where the degree of certainty is below a predefined threshold.

Figure 2:
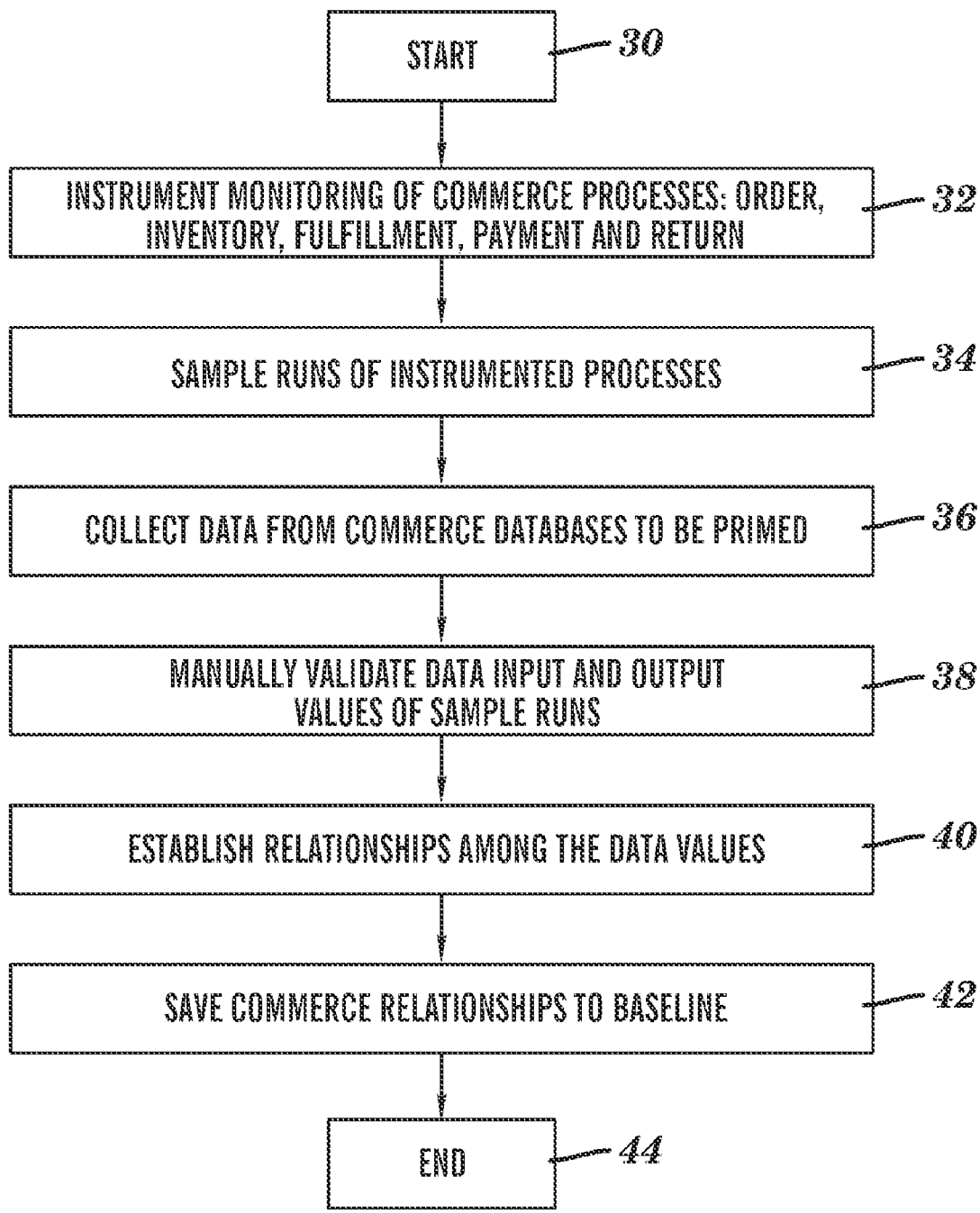
FIG. 2 illustrates one example of a flowchart illustrating a priming process for acquiring commerce baseline data according to the exemplary embodiments of the present invention.

Referring to FIG. 2, one example of a flowchart illustrating a priming process for acquiring commerce baseline data according to the exemplary embodiments of the present invention is illustrated. In particular, the flowchart shows an off-line method for acquisition of baseline data (priming) for the purpose of identification and establishment of process relationships. This data and the discovered relationships are then stored in a baseline database that is consulted at runtime for comparison purposes.

In particular, the priming process commences at step 30. At step 32, the commerce processes are monitored. Some of these processes include: order, inventory, fulfillment, payment, and return processes. At step 34, the runs of the instrumented processes are sampled. At step 36, data is collected from commerce databases in order to be primed. At step 38, data input and data output values of sample runs are manually validated. At step 40, relationships among the data values are established. At step 42, the commerce relationships are saved to the baseline. At step 44, the priming process used to acquire commerce baseline data is terminated.

Figure 3:
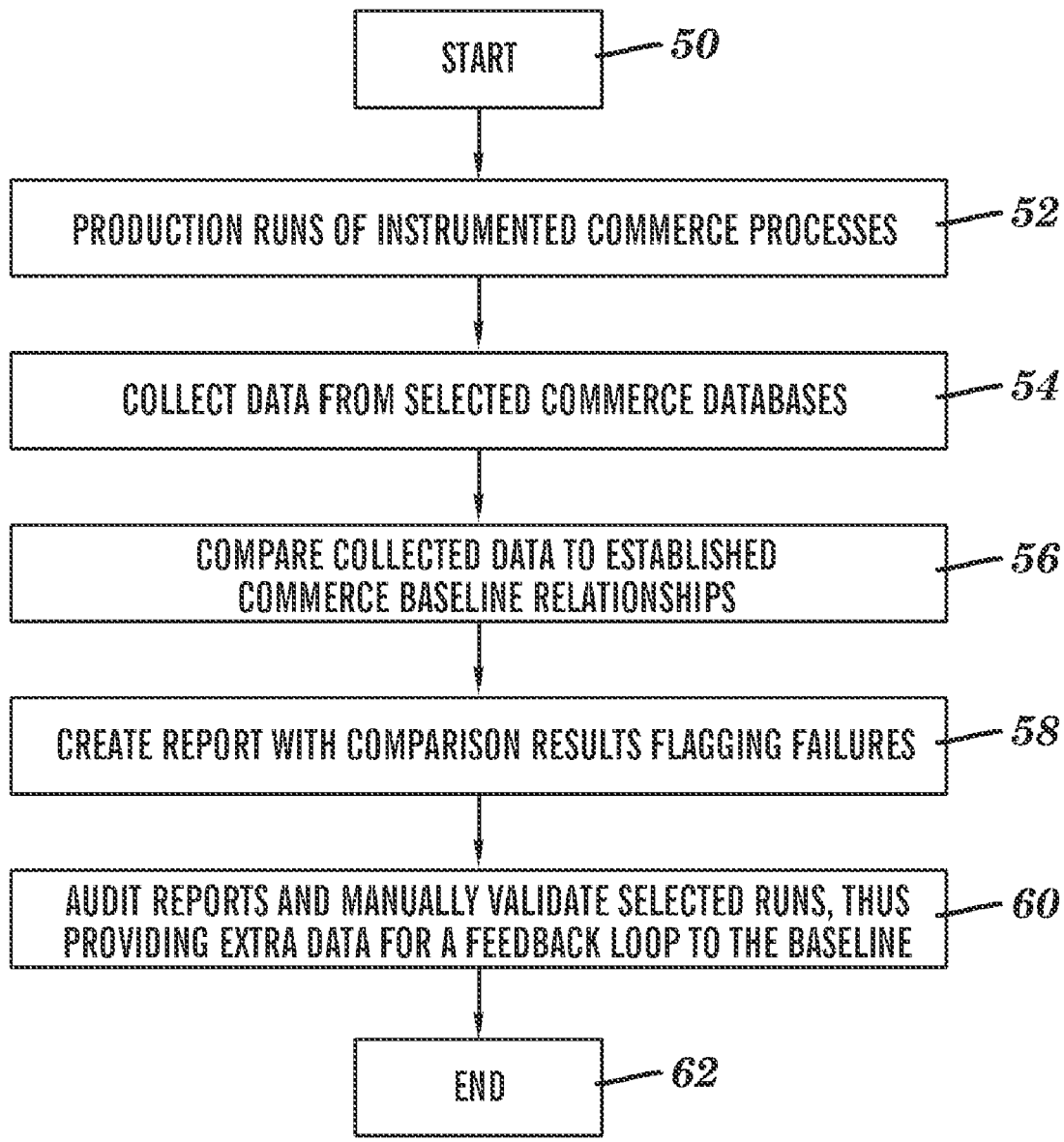
FIG. 3 illustrates one example of a flowchart illustrating a runtime operation process where automatic assurances reports are created according to the exemplary embodiments of the present invention.

Referring to FIG. 3, one example of a flowchart illustrating a runtime operation process where automatic assurances reports are created according to the exemplary embodiments of the present invention is illustrated. Specifically, this flowchart shows the runtime method that uses instrumented commerce components in order to compare process data values to the baseline values stored in previous runs of the same processes. The real-time values collected are compared to the ones in the baseline database and if they don't fall within specific ranges nor are part of the same specific relationships previously identified then they are flagged as potential process failures and emphasized in the automatic assurance reports that are created. If a human auditor later validates these flagged potential failures as valid process values and relationships, then a new baseline is created by a feedback loop, and the commerce baseline database is updated accordingly.

In particular, the runtime operation process starts at step 50. At step 52, production runs of instrumented commerce processes are executed. In step 54, data from the selected commerce database are collected. In step 56, the collected data is compared to the established baseline relationships. In step 58, a report with comparison results flagging failures is created. In step 60, the reports are audited and the selected runs are manually validated. This step provides extra data for a feedback loop to the baseline. In step 62, the runtime operation process where automatic assurance reports are created is terminated.

Therefore, the exemplary embodiments of the present invention do not intend to use prediction in order to manipulate output value ranges. Instead, the exemplary embodiments are more focused on detecting when the output value ranges are out of the permitted bounds, and then flag these instances for human intervention. As a result, not all the relationships in a model are required to be predicted. Only those relationships in the model that affect permitted bounds, for example, the price paid and the price refunded on some merchandise for a retail transaction. Thus, the exemplary embodiments attempt to automate financial assurance and not try to maximize, e.g., financial gains or sales volume. In other words, a data mining (training) process is used in order to identify very special relationships among data, and not the whole model, for the purposes of detecting deviations. Consequently, the exemplary embodiments focus on "training" in a more optimized manner for solving auditing process issues.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method for predicting and automatically verifying data assurance of a plurality of data values located in software processes in an e-commerce environment by a pattern recognition module for performing auditing processes, the method comprising:
    running the software processes on a data processing device;
    running the software processes a finite number of times for creating baseline information based on collected data values;
    verifying the collected data values of the baseline information of the software processes;
    evaluating the baseline information by the pattern recognition module by comparing the collected data values of the baseline information with predetermined data values of predetermined information stored in a baseline database;
    establishing relationships between the collected data values and the predetermined data values to produce output data;
    creating a data assurance report including the output data;
    determining whether the output data is valid;
    storing the output data in the storage device;
    flagging data values outside permitted bounds;
    permitting a user to perform manual data assurance on the data values outside the permitted bounds; and
    updating the baseline database to include the collected data values of the baseline information without the data values outside the permitted bounds;
    wherein the pattern recognition module compares and selects one or more patterns of the collected data values for performing the auditing processes;
    wherein in the event that a degree of certainty of a pattern is greater than a predetermined threshold value, the degree of certainty of the pattern is used in the auditing processes and in the event the degree of certainty of the pattern is less than the predetermined threshold value, the pattern is not recognized and an anomaly entry is created; and
    wherein the established relationships predicted are limited to relationships that affect the permitted bounds.

2. The method of claim 1, further comprising determining whether the flagged data values are outside the permitted bounds by comparing the flagged values with predetermined data values stored in the baseline database.

3. A system for predicting and automatically verifying data assurance of a plurality of data values located in software processes in an e-commerce environment by a pattern recognition module for performing auditing processes, the system comprising:
    a network; and
    a host system in communication with the network, the host system including software to implement a method comprising:
        running the software processes a finite number of times on a data processing device;
        priming the software processes for creating baseline information based on collected data values;
        verifying the collected data values of the baseline information of the software processes;
        evaluating the baseline information by the pattern recognition module by comparing the collected data values of the baseline information with predetermined data values of predetermined information stored in a baseline database;
        establishing relationships between the collected data values and the predetermined data values to produce output data;
        creating a data assurance report including the output data;
        determining whether the output data is valid;
        storing the output data in the storage device;
        flagging data values outside permitted bounds;
        permitting a user to perform manual data assurance on the data values outside the permitted bounds; and
    updating the baseline database to include the collected data values of the baseline information without the data values outside the permitted bounds;
        wherein the pattern recognition module compares and selects one or more patterns of the collected data values for performing the auditing processes;
        wherein in the event that a degree of certainty of a pattern is greater than a predetermined threshold value, the degree of certainty of the pattern is used in the auditing processes and in the event the degree of certainty of the pattern is less than the predetermined threshold value, the pattern is not recognized and an anomaly entry is created; and
        wherein the established relationships predicted are limited to relationships that affect the permitted bounds.

4. The system of claim 3, further comprising determining whether the flagged data values are outside the permitted bounds by comparing the flagged values with predetermined data values stored in the baseline database.

5. A computer program product for predicting and automatically verifying data assurance of a plurality of data values located in software processes in an e-commerce environment by a pattern recognition module for performing auditing processes, the computer program product comprising:
    a storage medium readable by a processing circuit and storing instructions for execution by the processing circuit for performing a method comprising:
        running the software processes a finite number of times on a data processing device;
        priming the software processes for creating baseline information based on collected data values;
        verifying the collected data values of the baseline information of the software processes;
        evaluating the baseline information by the pattern recognition module by comparing the collected data values of the baseline information with predetermined data values of predetermined information stored in a baseline database;
        establishing relationships between the collected data values and the predetermined data values to produce output data;

creating a data assurance report including the output data;
determining whether the output data is valid;
storing the output data in the storage device;
flagging data values outside permitted bounds;
permitting a user to perform manual data assurance on the data values outside the permitted bounds; and
updating the baseline database to include the collected data values of the baseline information without the data values outside the permitted bounds
wherein the pattern recognition module compares and selects one or more patterns of the collected data values for performing the auditing processes;

wherein in the event that a degree of certainty of a pattern is greater than a predetermined threshold value, the degree of certainty of the pattern is used in the auditing processes and in the event the degree of certainty of the pattern is less than the predetermined threshold value, the pattern is not recognized and an anomaly entry is created; and
wherein the established relationships predicted are limited to relationships that affect the permitted bounds.

* * * * *